Oct. 5, 1937.   I. C. HONEGGER   2,094,599
DECORATIVE SURFACE
Filed May 16, 1934
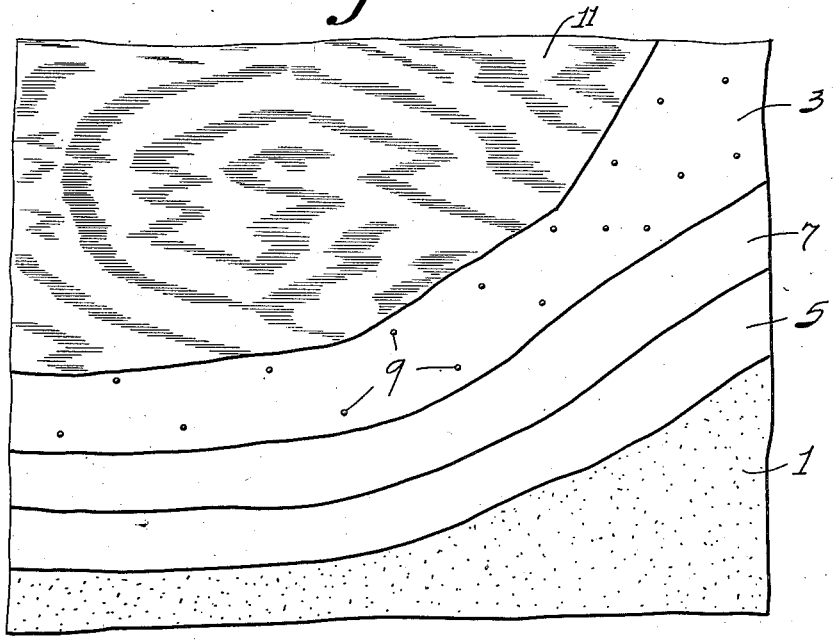
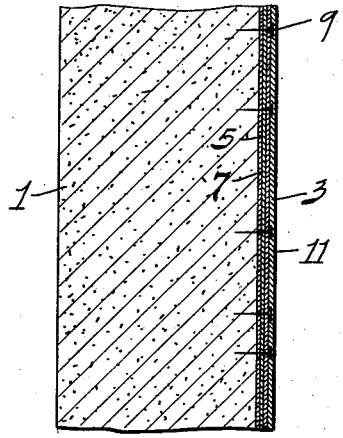 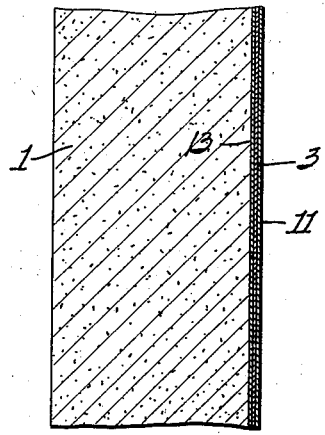
INVENTOR
Irving C. Honegger
BY
ATTORNEY Patented Oct. 5, 1937

2,094,599

UNITED STATES PATENT OFFICE 2,094,599

DECORATIVE SURFACE

Irving C. Honegger, Houston, Tex., assignor to Aluminum Company of America, Pittsburgh, Pa., a corporation of Pennsylvania Application May 16, 1934, Serial No. 726,009

5 Claims. (Cl. 72—125)

This invention relates to building materials and has particular application to an improved wall surfacing of plastic paints and the like.

It is well known that plastic materials of this type cannot be applied directly upon plaster walls or similar surfaces, having absorptive properties, or over a surface that will rust, crack, or peel. Prior to my invention no practical means has been available for satisfactorily providing this surface, although wall board and plaster board of the familiar types have been extensively employed. However, materials of this nature are, for various reasons, undesirable and unsuitable. In the first place, all the materials which have been used previously are heavy, thick, and cumbersome and must be sized one or more times to make them relatively non-absorbent. Also, the seams between two sections of the material must be plastered and sealed with perforated metal tape prior to the application of the plastic paint. Further, due to the fact that the weight of such materials makes it impossible for them to be handled readily and easily, the cost of assembly and erection is rather high.

It is among the objects of this invention to provide an interior wall surface to which is applied plastic paint materials, effective under widely varying conditions, and economical; and which overcomes the disadvantages heretofore encountered in similar wall surfaces.

I have found that these and other objects are accomplished in a highly efficient manner by applying a layer of metal foil such as aluminum foil to the wall surface prior to the application of the plastic paint, and then covering the foil with a coat of the plastic decorative material.

In the preferred embodiment of the invention, foil is prepared for use by attaching a thin stiffener or backing to one side of the sheet by a suitable adhesive. In attaching the foil to the backing, I prefer to turn the foil back on the under side of the edges of the backing to prevent absorption at the edges. I also prefer to lap the seams of the structure about one-half inch to provide a tight, smooth joint which is practically seamless. In another embodiment of the invention, which I have found to be quite satisfactory also, the foil is prepared for use by applying a layer of asphalt to one side.

In the use of such structures in interior decorating, the foil is placed against the surface to be covered and is attached thereto directly and simply by "shower" tacking or by a suitable adhesive, after which the decorative plastic material is applied. The term "plastic paint" as used herein and in the appended claims refers to the plastic paints in most general use today which are water-base coatings and usually consist largely of gypsum and plaster of Paris, or materials of a similar nature. They have characteristically a distinct alkaline reaction, and they are applied in the form of a thick paste or a suspension in water. I have found that plastic materials of this type are of such composition that they etch their way readily into the surface of the foil, and, as a result, adhere tightly thereto. After the plastic material dries, several coats of sizing and color glazing are applied. The ultimate result is a surface which is not only decorative and pleasing in appearance but which is likewise rigid, substantial, and permanent.

In the preferred embodiment of the invention, aluminum foil is used. The backing applied to the foil is preferably very thin, and may, if desirable, be omitted entirely, its thickness being, of course, dependent upon the rigidity desired in the composite structure.

The advantages of this method of interior wall surfacing will now be readily understood. In the first place, the foil underbase is decidedly impermeable and non-absorptive and as a result moisture does not pass therethrough to the decorative surface and destroy the coating by loosening the plastic material. Furthermore, due to the fact that the foil surface is non-absorptive the drying of the plastic material after it has been applied to the foil is delayed, with the result that the surface becomes more durable and permanent, the length of time which it may be worked is increased, and the drying controlled to best advantage.

A particular advantage of the invention resides in the ease of handling the thin and flexible foil. For instance, the prepared foil may be slipped readily behind door and window facings, whereas the building boards used previously are so thick that the appearance of the facings is usually destroyed and the use of some type of molding necessitated.

Another advantage can be found in that, by lapping the foil joints in the manner described above, a joint is provided which is very tight and which is so smooth that it is no longer necessary to seal the joints with a perforated metal tape, as was the case heretofore, in order to eliminate seams in the finished structure. This results in a considerable saving of time and expense, for the perforated tape is not only difficult to prepare and apply, but is also rather costly.

The invention is illustrated clearly in the accompanying drawing, in which:

Fig. 1 is a view, with parts broken away, showing a section of a wall decorated in accordance with one embodiment of my invention;

Fig. 2 is a transverse section illustrative of the structure employed in my invention; and Fig. 3 is a similar view showing a modified form of my invention.

In the drawing, in which like reference numbers refer to similar parts in each of the views, 1 indicates a surface to be decorated in accordance with my invention. To this surface I prefer to apply a structure comprising a layer of foil 3 attached to a suitable backing material such as Manila board 5 or the like by a suitable adhesive 7. The prepared foil 3 may be applied to the wall 1 in any suitable fashion, but I have found that it may be conveniently and readily attached by using numerous small tacks 9.

After the prepared foil 3 is attached to the wall 1 the outer surface is finished by applying a coat of a decorative plastic material 11 which I have found adheres directly to the foil. The material 11 is allowed to dry and, upon the application of a suitable size, the finished surface is obtained.

In the modified form shown in Fig. 3 I have substituted a layer of asphalt 13 for the Manila board 5. In this case, of course, the adhesive 7 may be omitted. It is also possible to eliminate the tacks 9, since foil having a backing of asphalt may be secured directly to the surface 1 by the asphalt.

While this invention has been described and illustrated hereinabove in accordance with certain preferred embodiments thereof, it will be understood that obvious changes and modifications may be made therein, as by substituting a coating of aluminum paint for the layer of foil, which are within the scope of the appended claims without departing from the spirit of my invention. I claim as my invention:

1. In combination with a building surface having a decorative coating of plastic paint, an underbase for said plastic paint comprising a sheet of metal foil to which is secured a flexible backing material.

2. In combination with a building surface, a decorative coating comprising an underbase attached to said surface consisting of a sheet of metal foil to which is secured a flexible backing material, and a coat of plastic paint on the outer face of said foil sheet.

3. A decorative coating for an interior building surface comprising an underbase consisting of a sheet of metal foil secured to said building surface, and a coat of plastic paint on the outer face of said foil sheet.

4. A decorative coating for an interior building surface comprising an underbase attached to said surface consisting of a sheet of paper-backed metal foil, and a coat of plastic paint on the outer face of said foil sheet.

5. A decorative coating for an interior building surface comprising an underbase consisting of a sheet of metal foil having a flexible backing of asphaltic cement which acts to secure said underbase to said building surface, and a coat of plastic paint on the outer face of said foil sheet.

IRVING C. HONEGGER.